April 25, 1933. C. LORENZEN 1,905,944
METHOD OF MAKING TUBULAR TURBINE BLADES
Filed Nov. 14, 1929
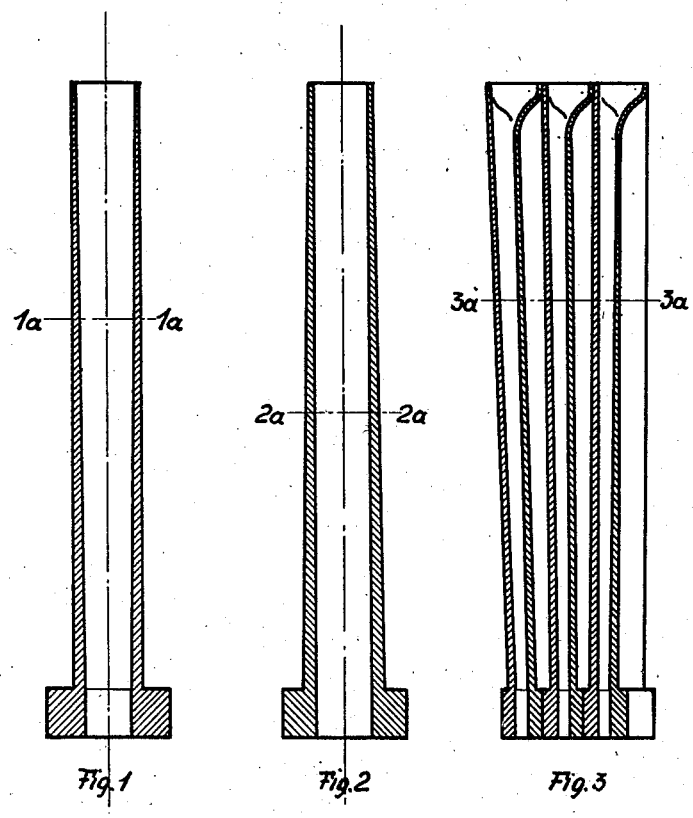
Inventor:
Christian Lorenzen
by
Lotka, Kehlenbeck & Farley
Attorneys.

Patented Apr. 25, 1933

1,905,944

UNITED STATES PATENT OFFICE

CHRISTIAN LORENZEN, OF BERLIN-TREPTOW, GERMANY, ASSIGNOR, BY MESNE ASSIGNMENTS, TO BENDIX AVIATION CORPORATION, OF CHICAGO, ILLINOIS, A CORPORATION OF DELAWARE

METHOD OF MAKING TUBULAR TURBINE BLADES

Application filed November 14, 1929, Serial No. 407,095, and in Germany November 14, 1928.

Solid blades for high-speed turbines have in some cases been made tapered for the purpose of increasing their strength. In order to obtain such tapered form, milling, planing, grinding, or similar mechanical operations have been employed to remove material either from the concave face of the blade, or from the convex side or back, or from both of these sides. These operations had to be performed with great care, and therefore consumed considerable time, since otherwise the resulting reduction in the width of the blade was liable to produce an unfavorable alteration of the entering and the discharge angles of the driving jet (steam or hot gases). In view of these circumstances, the production of such tapered blades was very complicated and expensive.

The object of my present invention is to produce tapered turbine blades by relatively simple operations requiring much less time than the complicated procedure referred to above. For this purpose, I take a tubular blank and reduce the thickness of its walls, so as to obtain the desired taper, either by a rolling or drawing operation, without removing any material, or by a simple turning operation in a lathe, in which case material is removed to produce the desired taper, but the blade surfaces are left circular in cross section, owing to the rotary movement of the lathe tool. After the hollow blank has thus been given a taper which causes the thickness of its wall to decrease from the inner portion of the blade to the outer portion, the blank thus prepared is given the proper blade form (generally crescent-shaped) in any suitable manner, for instance by bending or pressure. The blades thus produced have great strength and possess special advantages as regards the transfer of heat, in cases where the blades are cooled by passing a cooling medium (for instance, air) through their interior. These advantages will be fully explained below.

Reference is to be had to the accompanying drawing, in which Fig. 1 is a longitudinal axial section of a tubular blank which has been given a tapered form in accordance with my invention; Fig. 2 is a longitudinal axial section of another form of blank in which the taper has been produced in a different way, also in accordance with my invention; Fig. 3 is a section, taken in the plane indicated at 3—3 in Fig. 3ª, and showing an assembly of three finished blades produced according to the species of my invention illustrated by Figs. 1 and 1ª; and Figs. 1ª, 2ª and 3ª show cross sections of three individual blanks or blades, on the lines 1ª—1ª, 2ª—2ª, and 3ª—3ª of Figs. 1, 2, and 3 respectively.

The blank which I prefer to employ when making turbine blades such as illustrated in the accompanying drawing, is a metal tube of circular cross section, having initially walls of uniform thickness from its outer end to a point adjacent to its inner end or foot, which is of greater thickness, as shown, in accordance with customary practice. The drawing does not show the initial condition of the blank in which the walls of the tubular body are of uniform thickness from the foot to the outer end, but illustrates the condition of the blank after the tubular body has been given an outward taper. In the case of Figs. 1 and 1ª, the tubular body has an outer surface of uniform diameter from end to end, while the inner surface is conical and flares outwardly, so that the resulting wall thickness is greatest at the foot, and tapers off toward the outer end of the blank. In Figs. 2 and 2ª, the reverse arrangement is shown, that is to say, the inner wall of the tubular body is of uniform diameter from end to end, while the outer wall is conical and flares inwardly (toward the foot). The result is the same as in Figs. 1 and 1ª, insofar as the wall thickness is greatest at the foot, and tapers off toward the outer end of the blank.

Whether I employ the method illustrated by Figs. 1 and 1ª, or that corresponding to Figs. 2 and 2ª, for the production of a tube whose thickness decreases toward the outer end, the reduction in thickness is obtained by very simple and readily available means, and by operations which are expeditious and inexpensive. For instance, the tubular blank having originally uniform thickness from the foot to the outer end, may be given the tapered thickness form, either according to Figs. 1 and 1ª, or according to Figs. 2 and 2ª, by a suitable rolling or a drawing operation which reduces the thickness of the tube wall, without removing any material. Or the same result may be obtained by placing the original blank in a lathe, and turning either the inner face of the blank or its outer face down to the conical shape shown in Figs. 1 and 2 respectively; such a turning operation would indeed remove material, but would be very simple, and would not require the special care which is necessary in the case of milling, planing, or grinding operations such as previously employed in the manufacture of solid blades. Whatever operation is employed by me for reducing or tapering the thickness of the tube wall, such operation preserves a circular cross section both of the inner tube surface and of the outer tube surface, throughout the length of the tubular body. By preserving such circular cross section, I am enabled to employ methods for reducing the wall thickness (such as rolling, drawing, turning) which are easily performed with existing simple machinery.

After the tubular body of circular cross section has been given an outwardly tapering wall thickness, the cross section remaining circular, the body thus formed is brought into the final blade form (generally crescent shaped, see Fig. 3ª) by any suitable operation, such as pressure or bending. It will be noted that in my invention the outward taper in thickness is produced first and the shaping of the blank to (crescent) blade form afterwards, which is the reverse of the prior art operation referred to above. It is much easier, more expeditious, and less expensive to reduce the wall thickness while the blank still has its regular shape (circular cross section) than after the blank has been pressed or bent to a crescent or other non-circular shape.

As referred to above, hollow blades of the character produced according to my invention may be cooled by passing a current of air or other suitable medium through them lengthwise. The hot driving medium, and particularly hot gases, will generally strike the crescent-shaped blade chiefly at a portion about midway between the foot and the outer end of the blade, and the heat of such gases will be dissipated or conveyed within the metal of the blade, both toward the outer end and toward the foot. The air or other cooling medium is generally made to flow outwardly within the blades, so that the blade portion adjacent to the foot will be in contact with the coolest air. Since according to my invention the wall of the hollow blade increases in thickness toward the foot, a much better convection or dissipation of heat occurs inwardly, that is, toward the foot, and the active or crescent-shaped portion of the blade is cooled efficiently, that is, its temperature will not be allowed to rise to a point endangering the strength of the metal. Such danger however, exists to a marked degree when a tubular turbine blade has a uniform wall thickness from end to end and therefore does not convey the major portion of the absorbed heat toward the inner end or coolest portion of the blade. With my improved hollow blade having a wall thickness increasing toward the foot, I may operate the turbine without detriment to the strength of the material, at much higher temperatures than when the hollow blade is of uniform thickness, and the efficiency of the turbine is increased when such high temperatures are employed (assuming, in each case, the same metal temperature at the foot of the blade). Owing to the high velocity of the driving medium and of the cooling medium, and to the fact that the thickness of the blade wall increases toward the foot, a very efficient transfer of heat is obtained with my improved blades.

Various modifications may be made without departing from the nature of my invention as defined in the appended claims.

While in the examples illustrated and described, the wall thickness of the blade increases throughout the length of the blade, from the outer end to the foot, this is not essential to the invention, since the gradual thickening of the blade toward the inner end or foot might occur only on a portion of the blade's length.

I claim:

1. The method of making tubular turbine blades, which consists in first giving a tubular blank having a longitudinal passage open at both ends, a shape in which its wall thickness increases toward one end of the blank, and then giving such tubular blank of tapered thickness the desired crescent shape to form a blade convex on one face and concave on the other.

2. The method of making tubular turbine blades, which consists in first giving a tubular blank having a longitudinal passage open at both ends, a wall thickness which increases toward one end of the blank, by an operation which preserves a circular cross section both for the inner and the outer surfaces of the tubular blank, and then transforming such tubular blank of tapered thickness and circular cross section into the desired crescent shape to form a blade convex on one face and concave on the other.

3. The method of making tubular turbine blades, which consists in first giving a tubular blank having a longitudinal passage open at both ends, a wall thickness which increases toward one end of the blank, by an operation which preserves a circular cross section both for the inner and the outer surfaces of the tubular blank and leaves one of said surfaces with a uniform cross sectional diameter throughout the length of the portion of the blank on which said operation is conducted, and then transforming such tubular blank of tapered thickness and circular cross section into the desired crescent shape to form a blade convex on one face and concave on the other.

4. The method of making tubular turbine blades, which consists in taking a tubular blank having a longitudinal passage open at both ends and a wall of uniform thickness around the main portion of said passage, then giving said tubular blank a shape in which its wall thickness along said main portion increases toward one end of the blank, and thereupon giving such tubular blank of tapered thickness the desired crescent shape to form a blade convex on one face and concave on the other.

5. The method of making tubular turbine blades, which consists in taking a tubular blank having a longitudinal passage open at both ends and a wall of uniform thickness around the main portion of said passage, then altering the thickness of said wall along said main portion, in such a manner that said thickness will increase toward one end of the blank, by an operation which preserves a circular cross section both for the inner and the outer surfaces of the tubular blank, and then transforming such tubular blank of tapered thickness and circular cross section into the desired crescent shape to form a blade convex on one face and concave on the other.

6. The method of making tubular turbine blades, which consists in taking a tubular blank having a longitudinal passage open at both ends and a wall of uniform thickness around the main portion of said passage, then altering the thickness of said wall along said main portion, in such a manner that said thickness will increase toward one end of the blank, by an operation which preserves a circular cross section both for the inner and the outer surfaces of the tubular blank and leaves one of said surfaces with a uniform cross sectional diameter from end to end, and then transforming such tubular blank of tapered thickness and circular cross section into the desired crescent shape to form a blade convex on one face and concave on the other.

7. The method of making tubular turbine blades, which consists in taking a tubular blank having a longitudinal passage open at both ends and a wall surrounding said passage and of a thickness which is uniform throughout the main portion of the blank but increased at one end thereof, then altering the thickness of said wall at its portion of uniform thickness, in such a manner that such thickness will increase toward one end of the blank, and thereupon giving such tubular blank of tapered thickness the desired crescent shape to form a blade convex on one face and concave on the other.

In testimony whereof I have hereunto set my hand.

CHRISTIAN LORENZEN.